United States Patent
Andersson

(10) Patent No.: US 6,243,491 B1
(45) Date of Patent: Jun. 5, 2001

(54) METHODS AND APPARATUS FOR CONTROLLING A VIDEO SYSTEM WITH VISUALLY RECOGNIZED PROPS

(75) Inventor: Russell L. Andersson, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/775,482

(22) Filed: Dec. 31, 1996

(51) Int. Cl.$^7$ ........................................................ G06K 9/00
(52) U.S. Cl. ............................................. 382/165; 345/326
(58) Field of Search .................................. 345/184, 167, 345/165, 158, 418, 473, 327, 333, 326, 347, 358, 161, 164, 961; 463/37, 38, 31, 32, 33; 382/165, 164, 216, 203, 110; 446/7, 219; 348/169, 162, 167, 168

(56) References Cited

U.S. PATENT DOCUMENTS

| | | | |
|---|---|---|---|
| 3,879,876 | * | 4/1975 | Morgan ..................................... 40/327 |
| 4,428,252 | * | 1/1984 | Manini ..................................... 74/625 |
| 4,491,325 | * | 1/1985 | Bersheim ................................. 463/38 |
| 4,893,182 | * | 1/1990 | Gautraud et al. ...................... 348/579 |
| 4,982,438 | * | 1/1991 | Usami et al. ........................... 382/154 |
| 4,991,223 | * | 2/1991 | Bradley ................................... 382/165 |
| 5,189,711 | * | 2/1993 | Weiss et al. ............................ 382/203 |
| 5,227,985 | * | 7/1993 | DeMenthon ............................ 702/153 |
| 5,416,513 | * | 5/1995 | Morisaki ................................. 348/169 |
| 5,565,891 | * | 10/1996 | Armstrong ............................. 345/167 |
| 5,629,990 | * | 5/1997 | Tsuji et al. ............................. 382/324 |
| 5,703,356 | * | 12/1997 | Bidiville et al. ....................... 250/221 |
| 5,887,073 | * | 3/1999 | Fazzari et al. ......................... 382/110 |
| 5,889,550 | * | 3/1999 | Reynolds ............................... 348/139 |
| 5,912,700 | * | 6/1999 | Honey et al. .......................... 348/157 |
| 5,960,098 | * | 9/1999 | Tao ......................................... 382/110 |
| 6,005,959 | * | 12/1999 | Mohan et al. ......................... 382/110 |

\* cited by examiner

*Primary Examiner*—Jay Patel
(74) *Attorney, Agent, or Firm*—Barry H. Freedman

(57) ABSTRACT

A passive prop for controlling the operation of a video game through visually detecting and tracking the prop. One aspect of the invention is a spherical prop of principally one color, but with a spot of another color located on the sphere. This provides control of a video system through tracking of position and orientation of the prop. Another aspect of the invention is a planar offset prop consisting of two color regions, a first color region being offset from a second color region. A third aspect of the invention allows the provision of a push-button control for a simple, passive prop, the push-button being effective to cause a color region of a prop to change color.

19 Claims, 6 Drawing Sheets

METHODS AND APPARATUS FOR CONTROLLING A VIDEO SYSTEM WITH VISUALLY RECOGNIZED PROPS

FIELD OF THE INVENTION

The present invention relates to control of a video system through tracking of a visual pattern. More particularly, the invention relates to methods and apparatus implementing a variety of multicolored props which can be easily tracked by a color recognition system, and whose movements are translatable into control inputs to control the operation of apparatus such as a video game or other video controlled device.

BACKGROUND OF THE INVENTION

A variety of computer and video systems exist today, which employ input devices, such as props. The props are held and manipulated by the user, and carry a color or pattern which is easily tracked by a color recognition system, and whose motion is easily followed by the color recognition system. The motion of the prop is translated into control inputs for a video or computer device. For example, in a video game or virtual reality system, a prop can be wielded by the user, and the motions of the prop can be used to direct motions of a character displayed on a screen. In contrast to wired props, which are expensive and which limit the user's movement, passive props can allow the user to move anywhere within the field of view of a camera which is part of the video system. Also, in contrast to wired, radio frequency ("RF") or infrared ("IR") control devices, which are relatively expensive, and which contain a certain amount of electronic circuitry, passive props can be inexpensive to produce, simply being made of plastic or paper with a design printed on the prop. Also, in contrast to the traditional wired joystick, which is a nuisance to attach and remove from the video system or computer, the passive prop is freely interchangeable. The user need merely cast one prop aside and take up another in order to make the change. Also, because of the simplicity and ease of manufacture of the prop, props can be manufactured and offered very inexpensively, enabling the user to afford a whole collection of props.

Various difficulties exist in the present use of passive props. For example, not every prop offers all desirable degrees of freedom. It may be desirable, for example, to allow a prop to be used to control a cursor on a television screen. In such a prop, five degrees of freedom would be desirable. Movement of the prop in the x, y and z directions can control gross movements of the cursor, and adjusting the pitch and yaw of the prop can be used to control fine movements of the cursor.

One difficulty with the use of passive props is the difficulty with disambiguation that occurs in some prop designs. Tracking of a passive prop may be performed through conic solutions. The design of many props results in two similar or identical conic solutions. It is difficult to disambiguate these solutions to accurately track the motion of the prop. A further difficulty is that presently existing props do not provide a sufficient range of control options. Thus, there exists a need in the art for improved passive prop designs which suffer from minimal ambiguity, which provide a convenient and precise method for controlling a cursor, and which provide an increased range of control.

SUMMARY OF THE INVENTION

One embodiment of the present invention is a sphere of a known color and size with a large dot of another color upon it. The x and y position and movement are established from the outline of the spherical surface. The z position and movement are established from the apparent area of the spherical surface. Since the actual size of the sphere is known, it is a simple matter to compare the apparent size of the sphere with the actual size to establish the z position. The pitch and yaw of the sphere are determined from the dot relative to the position of the sphere.

Another embodiment of the present invention is used to increase the ability to disambiguate the potential conic solutions. In this embodiment, the prop consists of a square within a circle. The square is moved off the plane of the circle. This can be done by placing a larger circle and a smaller square parallel to one another along a cylinder. The general shape of the prop can be that of a bowl, or of an inverted bowl, depending on the particular design choice made. A small offset can significantly help address the problem of disambiguation.

Another advantageous prop design in accordance with the present invention is a push-button design. In addition to controlling a video or computer device through the motion of the prop, a push-button would permit the user an additional degree of control by adding an additional binary choice. The addition of a push-button feature can make a passive prop usable in the same way as a computer mouse, for example. The user could use the prop to move a cursor or pointer over a radio button and use the push-button to activate the radio button. Multiple buttons of course could be employed.

To this end, in a further additional embodiment of the present invention, a prop has a pattern that faces the camera of a video system. The user holds a handle or other structure on the back side of the prop. The prop has a hole in the center. The hole is occluded by a non-recognized background color or by a swatch of the surrounding color. The color of the center point is changed when a button is pressed by the user. This color change is recognized by the prop detection of the video system.

A more complete understanding of the present invention, as well as further features and advantages of the invention, will be apparent from the following Detailed Description and the accompanying drawings.

DETAILED DESCRIPTION

Figure 1:
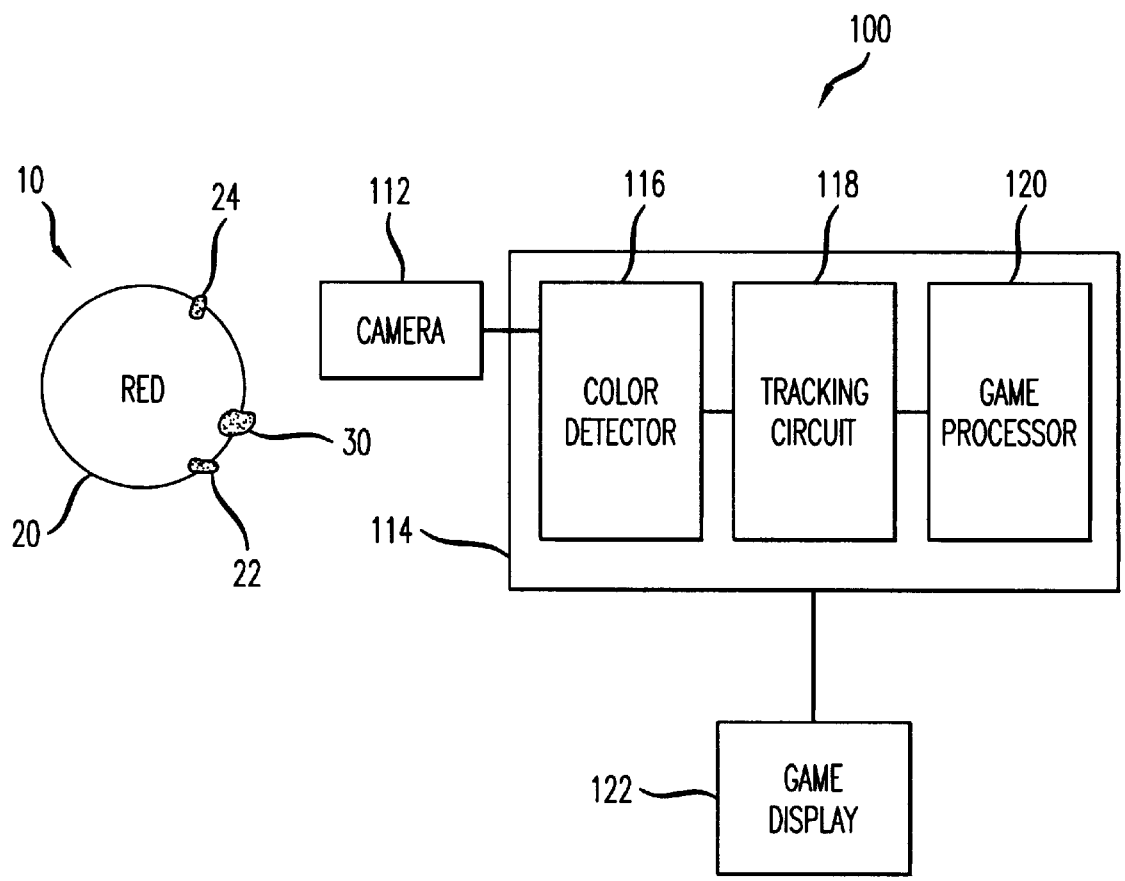
FIG. 1 is an "eyeball" prop according to an embodiment of the present invention.

FIG. 1 shows a prop 10 in accordance with one embodiment of the present invention with the prop 10 shown in relation to a video game system 100 with which it can suitably be used. Video game system 100 consists of a camera 112, a video game processor 114, and a video display unit 122. Video game processor 114 includes a color detector 116, a color tracker 118, and a game processor 120. Prop 10 is preferably designed to be easily detected and tracked by a video game system such as the video game system 100. Prop 10 preferably consists of a sphere 20 of known size and of uniform color. Sphere 20 preferably contains indentations 22 and 24 or tend to direct which induce the user to hold it in a preferred orientation relative to camera 112. A circular dot 30 of a different color is located on the surface of the sphere 20. Sphere 20 is preferably of a distinctive color which is readily distinguishable from the colors of background objects, and which is easily detectable by a color detection device. Dot 30 is likewise preferably chosen of a color readily distinguishable from those of background objects.

Prop 10 offers several advantages. First, as a sphere, it is relatively immune to highlighting. Unlike a planar prop which has very different reflection characteristics as it is angled toward or away from a light source, spherical prop 10 does not significantly change its reflective characteristics with changes in orientation. Secondly, prop 10 can be grasped in such a way as to allow the user fine control, as of a cursor, as well as gross control. Thirdly, the dot 30 on prop 10 allows the orientation to be conveniently detected. The colors of sphere 20 and dot 30 can be distinguished by color detection and processing circuitry or a suitable combination of hardware and software. The relative positions of the dot 30 and the sphere 20 can be computed and used to provide control inputs.

Spherical prop 10 is able to provide control in the x, y and z directions. Control in the x and y directions is provided by tracking the position of prop 10 within a frame of video data. Control in the z direction is provided by comparing the apparent area of prop 10 within a frame of video data with the known size of the prop 10. Control of pitch and yaw are provided by tracking the position of dot 30 relative to sphere 20.

The indentations 22 and 24 tend to induce a user to hold the prop 10 such that dot 30 is not aligned with an axis through the sphere 20 and pointing at camera 112 when prop 10 is normally held and utilized.

The images of sphere 20 and prop 30 are processed by a video system, such as the video system 100, into conic sections. These conic sections remain conic sections even after distortion by a perspective transform. The mathematics of the conic sections provides a way to find the perspective distortion, and thus the location of prop 10 relative to a camera, from the statistics of the apparent shape of prop 10. The presence of dot 30 on prop 10 also allows a video system to determine the orientation of prop 10 by projecting separate conic sections for sphere 20 and dot 30. The relative orientations and positions of conic sections processed from sphere 20 and dot 30 can be determined by a video system and used to determine the position and orientation of prop 10.

Figure 2:
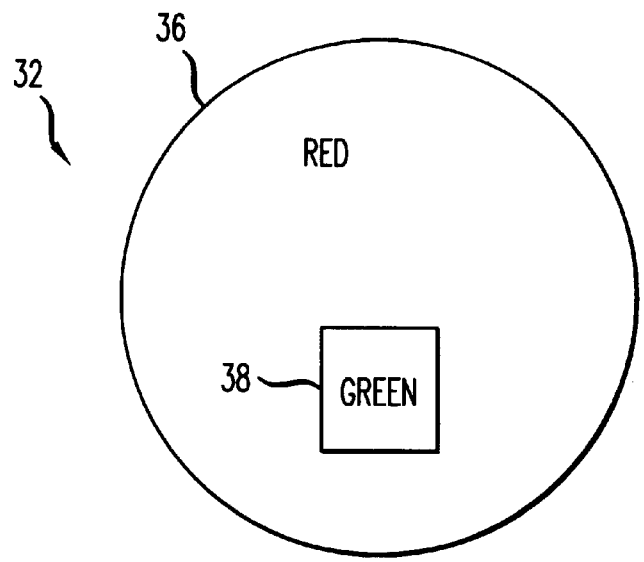
FIG. 2 is front view of a planar offset prop according to another embodiment of the present invention, consisting of a square within and offset from a circle, the square being offset forward of or in front of the circle.

FIG. 2 shows a planar offset prop 32 according to another embodiment of the present invention. Prop 32 preferably includes a large circular color region 36 and a smaller square color region 38. Each of the circular color region 36 and the square color region 38 is generally planar. Depending on the application to which prop 32 is to be put, circular color region 36 and square color region 38 may or may not share a common center.

Figure 2A:
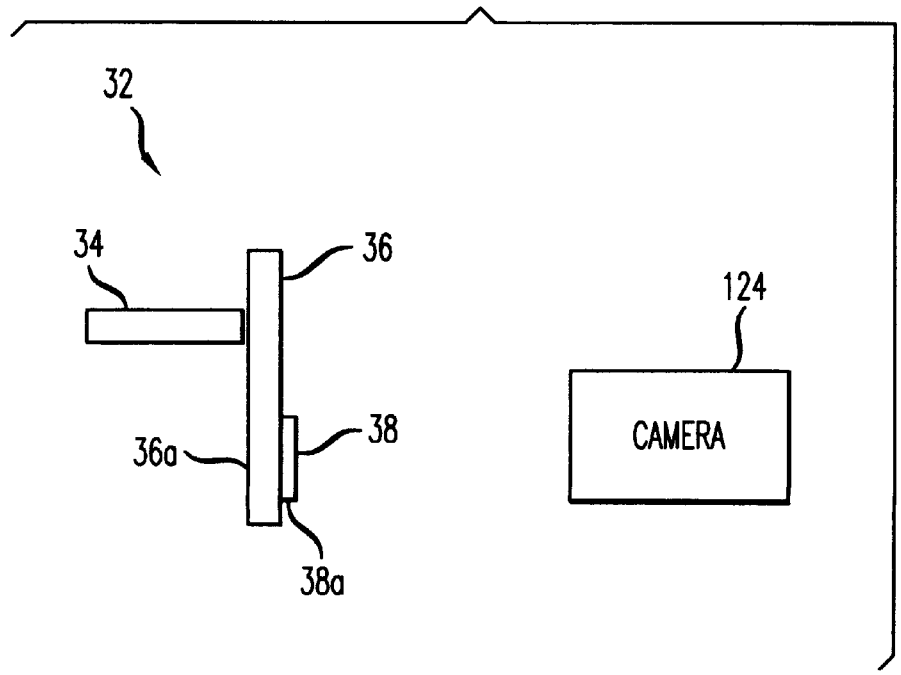
FIG. 2A is a side view of the planar offset prop of FIG. 2, showing additional details of the prop illustrated in FIG. 2.

FIG. 2A is a side view of prop 32, shown in a representative orientation and position with respect to a video camera 124. Video camera 124 may be used with the prop 32 in a video system, such as the video game system 100. FIG. 2A shows a handle 34 by which the prop 32 can be held. From FIG. 2A, it can be seen that circular color region 36 and square color region 38 each rest on a substrate 36a and 38a respectively, each of the substrates 36a and 38a having a finite and significant thickness. The thickness of substrate 38a serves to offset square color region 38 toward the camera 124 when prop 32 is held in a typical position and orientation relative to camera 124. This greatly simplifies disambiguation of different conic sections projected by different orientations of prop 32. This embodiment of the present invention causes some occlusion problems, in that light from square color region 38 obstructs light from circular color region 36. This difficulty is offset by the significant disambiguation provided by this embodiment, particularly since the offset between circular color region 36 and square color region 38 can be very slight, thus minimizing occlusion, and still provide significant disambiguation.

Figure 2B:
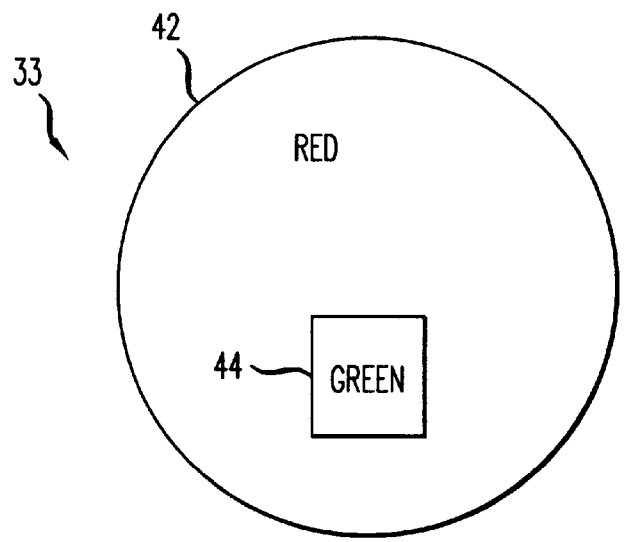
FIG. 2B is a front view of a planar offset prop according to another embodiment of the present invention, consisting of a square within and offset from a circle, the square being offset rearward of or in front of the circle.

FIG. 2B shows a second planar offset prop 33 according to another embodiment of the present invention. Prop 33 preferably includes a large circular color region 42 and a smaller square color region 44. Both the circular color region 42 and the square color region 44 are preferably generally planar.

Figure 2C:
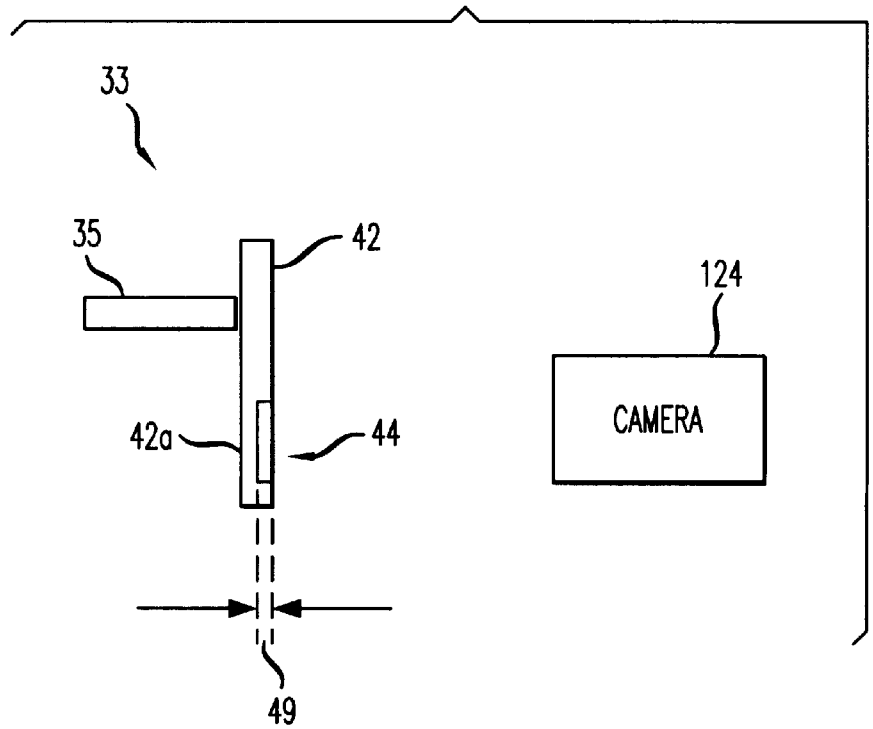
FIG. 2C is a side view of the planar offset prop of FIG. 2B, showing additional details of the prop illustrated in FIG. 2B.

FIG. 2C shows a side view of the prop 33, shown in a representative orientation and position with respect to a video camera 124. FIG. 2C shows a handle 35 by which prop 33 can be held. From FIG. 2C it can be seen that the circular color region 42 rests on a substrate 42a, the substrate 42a having a significant thickness. A section is cut out of the substrate 42a for a square color region 44, which is placed at the bottom of the cut out section. Square color region 44 is thus offset away from camera 124 when prop 33 is held in a typical position and orientation relative to the camera 124. This greatly simplifies disambiguation of different conic sections projected by different orientations of prop 33.

This embodiment of the present invention causes a slight occlusion and a gap 49 between the circular color region 42 and the square color region 44. This gap may slightly complicate run-length processing typically used by a video system to track a moving prop. These complications are offset by the increased disambiguation provided by the prop 33, particularly since, as with prop 32, a slight offset provides significant disambiguation.

Figure 2D:
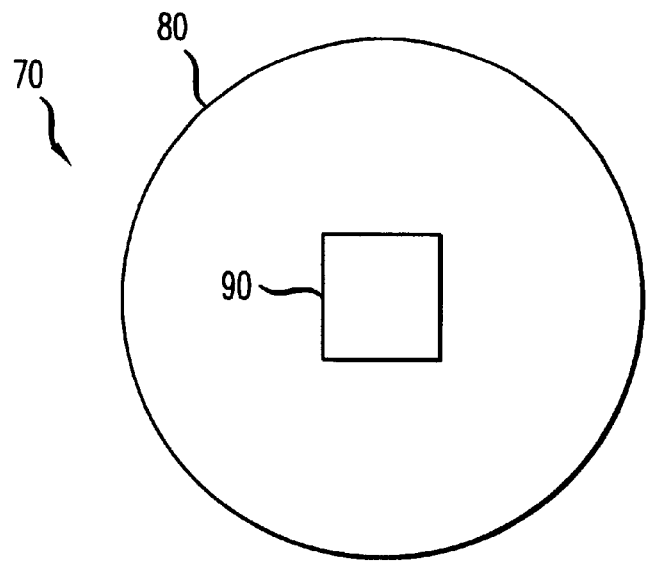
FIG. 2D is a front view of a bowl-shaped prop according to the present invention.

The occlusion issue raised by props 32 and 33 can be eliminated by another embodiment of the present invention. FIG. 2D shows a bowl-shaped prop 70 according to this embodiment of the present invention. Prop 70 consists of a concave, or bowl, shape 80 of a predetermined size, such as the size of a handguard of a fencing foil, and uniform color. A square 90 of a known, easily distinguishable color, is located on the bowl shape 80. The colors of bowl shape 80 and square 90 are chosen so as to be easily distinguishable from one another and from background objects.

Figure 2E:
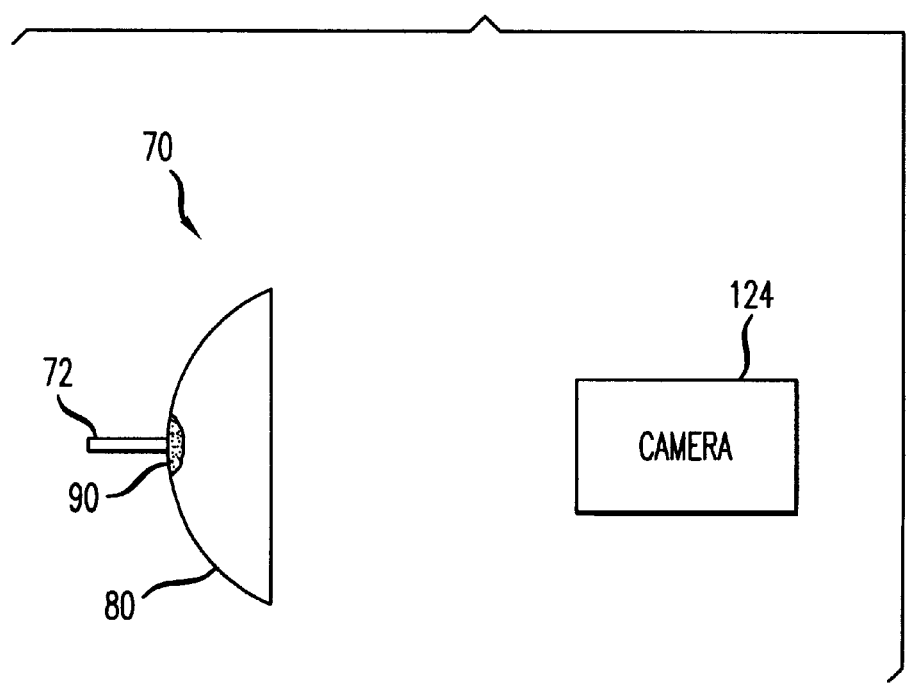
FIG. 2E is a side view of the prop of FIG. 2D, showing additional details of the prop illustrated in FIG. 2D.

FIG. 2E is a side view of the prop 70, more clearly showing its shape, and showing a representative position and orientation relative to camera 124. FIG. 2E also shows a handle 72, by which a user can hold and manipulate the prop 70. Placing square 90 at the bottom of bowl shape 80 provides an offset, which simplifies disambiguation as described above with respect to the props 32 and 33, but without the occlusion which would result if square 90 were separated from bowl shape 80. Prop 70 causes an intensity gradient, but this is more than compensated by the simplification of disambiguation which the design of prop 70 provides.

Figure 3:
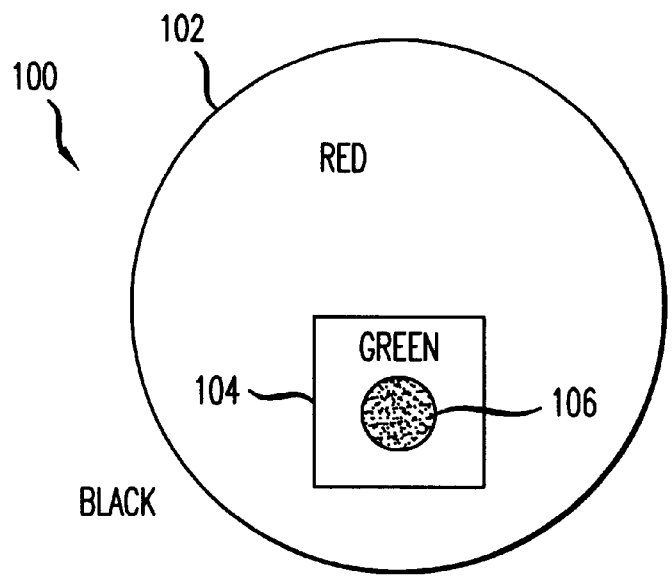
FIG. 3 is a front view of a push-button prop according to another embodiment of the present invention, with the push-button not actuated.

FIG. 3 is a front view of a push-button prop 100 according to another embodiment of the present invention. Prop 100 gives a user an additional degree of control by providing the equivalent of a binary switch. The push-button of prop 100 can be used, for example, as the equivalent of a mouse button. Alternatively, for example in a role-playing computer game, the push-button can be used to enable the player's character to pick up or drop objects, by using the prop 100 to move a cursor over the object and pressing the push-button to pick it up. FIG. 3 shows a generally planar first color region 102, a generally planar square color region 104, and a hole 106 in the center of square color region 104. While a square region 104 is shown, it will be recognized that a circle or other predetermined shape might also be employed. FIG. 3 shows prop 100 in the condition in which a button 110 shown in FIG. 3B is not pushed. With the button 110 not pushed, hole 106 is black, as illustrated, but it will be recognized that it could be any of a number of predetermined recognizable colors.

Figure 3A:
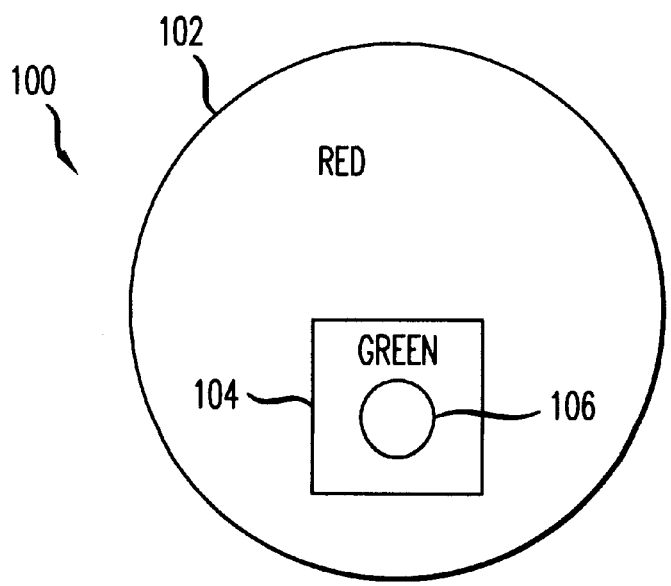
FIG. 3A is a front view of the push-button prop of FIG. 3 with the push-button actuated.
Figure 3B:
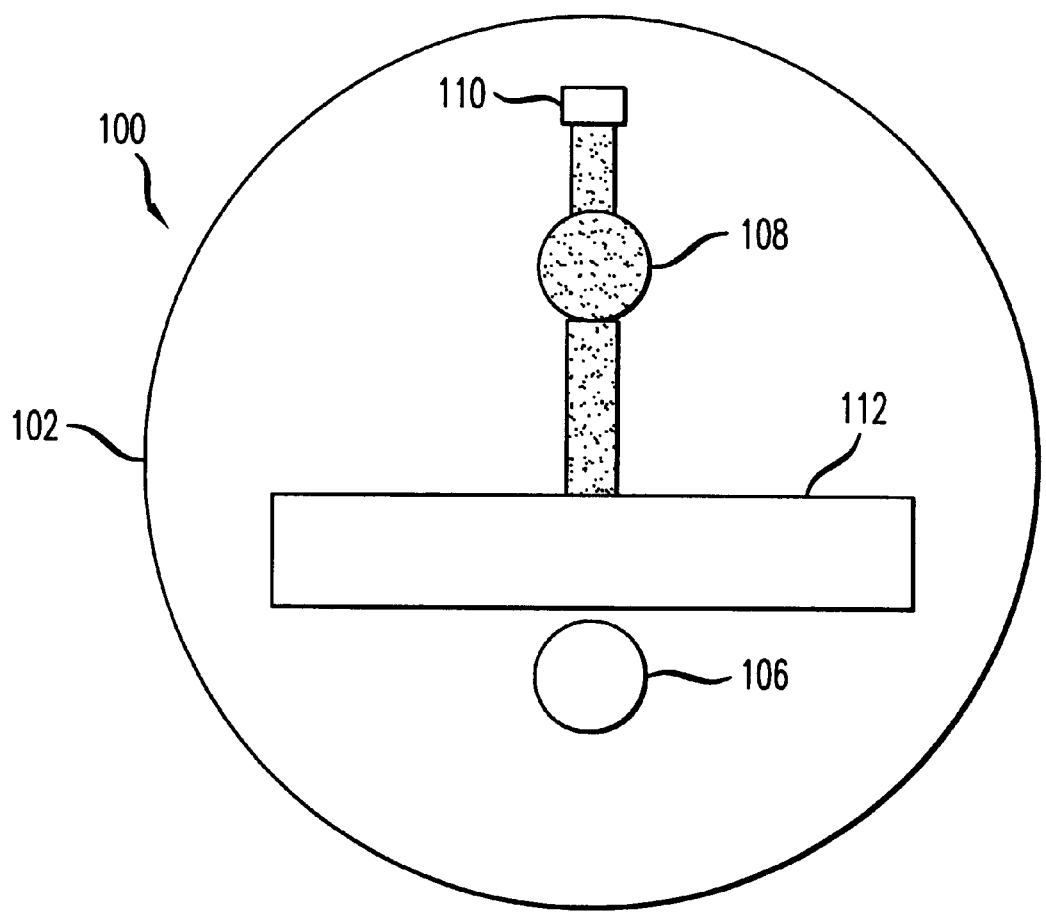
FIG. 3B is a back view of the push-button prop of FIG. 3 showing additional details of the prop.

FIG. 3A is a front view of prop 100 with the button pushed. Hole 106 is now white, as illustrated, but it will be recognized that it could be any of a number of predetermined recognizable colors different than the color selected to appear when button 110 (shown in FIG. 3B) is not pushed.

FIG. 3B is a rear view of the prop 100, showing further details of the prop 100. In addition to the circular color region 102 and the hole 106, FIG. 3B additionally shows a handle 108 by which the prop 100 can be held by a user, the button 110 is located on the handle 108, and provides one suitable mechanism by which hole 106 is made to change color. A slider bar assembly 112 is controlled by operation of the button 110. Slider bar assembly 112 is of a desired, easily distinguishable color, preferably distinct from the colors of circular color region 102 and square color region 104. When button 110 is not pressed, slider bar assembly 112 remains above hole 106. When the user presses button 110, the slider bar assembly 112 moves down, covering hole 110. For the purposes of illustration, the slider bar assembly is white. Therefore, when slider bar assembly 112 covers hole 110, the hole 110 appears white. Handle 108 may also suitably include grip preferably shaped so that the user may comfortably and conveniently hold and manipulate the prop 100. While a simple mechanical assembly is described above, it will be recognized that other arrangement may suitably be employed.

While the present invention has been disclosed above in the context of a number of presently preferred embodiments, it will be recognized that a wide variety of implementations may be employed by persons of ordinary skill in the art consistent with the above teachings and the claims which follow below.

I claim:

1. A video system controlled by a prop having a known color pattern such that said prop is amenable to being tracked by said video system, said video system comprising:
    a prop including
        sphere having two colors,
            a first color region located on said sphere having one of said two colors, and
            a single second color region located on said sphere having the other of said two colors, said second color region being smaller than said first color region and contained substantially within said first color region; and
    control means in said video system for determining pitch and yaw by tracking the position of said second color region on said sphere relative to the position of said sphere.

2. The prop of claim 1 wherein said second color region is circular in shape.

3. The video system of claim 1, wherein said control means controls position in x and y directions by tracking position of the prop within a video frame and controls position in a z direction by comparing an apparent area of the prop to a reference area.

4. A passive prop for controlling a video system, said prop having a shape and color pattern such that said prop is amenable to being tracked by said video system through recognition by said video system of said shape and said color pattern, said prop comprising:
    a generally planar surface containing a first color region; and
    a second color region, said second color region being of a color distinct from said first color region, said second color region being distinctly smaller than said first color region and generally surrounded by said first color region, said second color region lying on a plane offset from said first color region.

5. The prop of claim 4 wherein said second color region lies on a plane forward of said surface containing said first color region.

6. The prop of claim 4 wherein said second color region lies on a plane rearward of said surface containing said first color region.

7. A passive prop for controlling a video system, said prop having a known size, shape and color pattern such that said prop is amenable to being tracked by said video system through recognition by said video system of said known size, said shape and said color pattern, said prop comprising:
    a surface containing a first color region, said surface being generally curved in the shape of a bowl;
    a single second color region of a color distinct from that of said first color region, said second color region being smaller than said first color region, contained substantially within said first color region and offset from a central axis defining said bowl-shaped surface; and
    a handle for controlling orientation of the surface, including orientation of said second color region with respect to said first color region.

8. A passive prop for controlling a video system, said prop having a shape and color pattern such that said prop is amenable to being tracked by said video system through recognition by said video system of said shape and said color pattern, said prop comprising:
    a generally planar surface containing a first color region;
    a second color region on said generally planar surface, said second color region being controllable to change a first and a second color; and
    an actuator for controlling the transition of said second color region from said first color to said second color.

9. The prop of claim 8 wherein said second color region is a hole in the surface of said first color region.

10. The prop of claim 8 wherein said actuator is a sliding bar positioned behind said generally planar surface away from said second color region which is operable to slide behind said second color region in response to operation of the actuator.

11. The prop of claim 10 further comprising a push-button assembly connected to said sliding bar, said push-button assembly being operable to slide said sliding bar behind said second color region when said push-button is pushed, and to slide said sliding bar away from said second color region when said push-button is released by said user.

12. A method for controlling a video system by visually detecting and tracking a spherical prop, said method comprising:

locating a first color region of a first color on the spherical prop;

locating a second color region within said first color region on said sphere, said second color region being of a color distinct from the color of said first color region; and determining the position of the prop from the outline of the spherical surface and a comparison of the apparent of the sphere with the actual size.

13. A method for controlling a video system, said video system having a camera for receiving visual inputs and visually detecting and tracking a generally planar prop, said method comprising:

locating a first color region of a first color on the prop;

locating a second color region within said first color region, said second color region being of a color distinct from the color of said first color region, said second color region being offset a known distance from said first color region relative to said camera; and disambiguating the data observed for the first and second color regions utilizing the known distance of said offset.

14. The method of claim 13 wherein said second color region is offset toward said camera.

15. The method of claim 3 wherein said second color region is offset away from said camera.

16. A method for controlling a video system, by visually detecting and tracking a prop, said method comprising:

locating a first color region of a first color on a surface of the prop;

locating a second color region within said first color region, said second color region being of a color distinct from the color of said first color region; and detecting a change in colors of said second color region in response to a control input from a user.

17. A passive prop for controlling a video system, said prop having a shape and color pattern such that said prop is amenable to being tracked by said video system through recognition by said video system of said shape and said color pattern, said prop comprising:

a sphere;

a first color region located on said sphere;

a second region located on said sphere, said second color region being smaller than said first color region and of a color distinct from said first color region; and a mechanism to influence a user of the passive prop not to locate said second color region on a line an axis through said sphere to the video system.

18. A passive prop for controlling a video system, said prop having a shape and color pattern such that said prop is amenable to being tracked by said video system through recognition by said video system of said shape and said color pattern, said prop comprising:

a surface containing a first color region, said surface being generally curved in the shape of a bowl; and a second color region of a color distinct from that of said first color region, said second color region being smaller than said first color region and contained substantially within said first color region wherein said second color region is located on the interior of said surface.

19. The method of claim 18 wherein said second color region is located at the bottom of said surface.

\* \* \* \* \*